US006886583B2

(12) United States Patent
Matsushima et al.

(10) Patent No.: US 6,886,583 B2
(45) Date of Patent: May 3, 2005

(54) CANISTER VENT VALVE MOUNTING STRUCTURE

(75) Inventors: Hideyuki Matsushima, Sagamihara (JP); Takayuki Iwasaki, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 229 days.

(21) Appl. No.: 10/366,523

(22) Filed: Feb. 14, 2003

(65) Prior Publication Data

US 2003/0168099 A1 Sep. 11, 2003

(30) Foreign Application Priority Data

Mar. 8, 2002 (JP) .................................... 2002-062782

(51) Int. Cl.[7] .............................................. F16K 27/00
(52) U.S. Cl. ...................................... 137/270; 123/520
(58) Field of Search ................................ 137/270, 269; 123/519, 520

(56) References Cited

U.S. PATENT DOCUMENTS 4,853,009 A * 8/1989 Turner et al. ............... 123/519
5,082,557 A * 1/1992 Grayson et al. ............. 137/270
6,192,912 B1 * 2/2001 Butler et al. ................ 137/270
6,589,319 B2 * 7/2003 Ikuma et al. ................ 123/519

FOREIGN PATENT DOCUMENTS

JP          8-210530 A1    8/1996

* cited by examiner

Primary Examiner—Kevin Lee
(74) Attorney, Agent, or Firm—Shinjyu Global IP Counselors, LLP

(57) ABSTRACT

A canister vent valve mounting structure for a canister vent valve is configured to prevent center deviation when the canister vent valve is connected to the canister and enables the canister to be shared by different vehicle models. The canister vent valve includes a connecting pipe part that fits into an insertion hole formed in the canister. Several mating projections are arranged in the circumferential direction of the connecting pipe part such that they are formed on the outside circumference of the connecting pipe part near the tip thereof. Several notches into which mating projections can be inserted are formed in the inside circumferential surface of the insertion hole. The canister vent valve mounting structure between the canister and the canister vent valve is configured and arranged to retain the canister vent valve in at least two different orientations relative to the canister.

24 Claims, 14 Drawing Sheets

CANISTER VENT VALVE MOUNTING STRUCTURE

BACKGROUND OF THE INVENTION

1. Field of the Invention

The present invention relates to a mounting structure for a canister vent valve. More specifically, the present invention relates to a mounting structure for rotationally fixing a canister vent valve to a canister in different angular positions relative to each other.

2. Background Information

A conventional method of mounting various types of control valves to a canister that adsorbs fuel vapors produced inside a fuel tank is described in Japanese Laid-Open Patent Publication No. 8-210530. In this publication, a pair of notches is formed in 180 degrees opposing positions in a rim of an insertion hole formed in the canister and a pair of complementary projections is formed on an outside circumference of a pressure pipe provided on the control valve. Both of the notches are shaped such that the projections can be inserted therein. In order to mount the control valve on the canister, the pressure pipe is first inserted into the insertion hole. Then, the control valve is rotated 90 degrees about the center axis of the pressure pipe such that the projections pass through the notches. Then, after the pressure pipe has been inserted into the insertion hole and the tip of the pressure pipe has touched against an inner flange formed on an inside circumferential wall of the insertion hole, the mounting is completed by rotating the control valve in the opposite direction with respect to the canister while the projections fit into respective groove parts formed in the inside circumferential wall of the insertion hole. This structure also includes an O-ring that seals the space between the outside circumference of the pressure pipe and the inside circumference of the insertion hole. The control valves mentioned above are solenoid valves and diaphragm valves. These valves usually have specified limits regarding their mounting angles with respect to the vehicle body in order to ensure the performance of the valves.

In view of the above, it will be apparent to those skilled in the art from this disclosure that there exists a need for an improved canister vent valve mounting structure. This invention addresses this need in the art as well as other needs, which will become apparent to those skilled in the art from this disclosure.

SUMMARY OF THE INVENTION

It has been discovered that only one relative positioning of the control valve and the canister can be achieved when the control valve is mounted to the canister with the conventional mounting structure just described above. However, in vehicles of recent years, the mounting space for the canister is often restricted due to expansions of the cabin space. Accordingly, many variations regarding the mounting direction of the canister with respect to the vehicle are required. On the other hand, when the mounting angle of the canister with respect to the vehicle changes, the mounting angle of the control valve with respect to the vehicle also changes in the same manner. Consequently, in order to keep the mounting angle of the control valve with respect to the vehicle within the mounting angle limits required to ensure the valve performance, the canister design must be modified every time the mounting angle of the canister with respect to the vehicle is changed. In order to satisfy both the restrictions on the mounting angle of the vent valve with respect to the vehicle and the need for different mounting directions of the canister with respect to the vehicle, it is necessary to increase the number of variations of the canister itself. However, increasing the number of variations of the canister is disadvantageous in terms of both component sharing and cost.

Furthermore, it has been discovered that since there is only one set of pairs of the notches and the projections, it is easy for the center positions of the pressure pipe and the insertion hole to deviate from each other when the control valve is mounted to the canister. Moreover, there is a risk that the O-ring will be pinched if the center positions of the pressure pipe and the insertion hole deviate from each other. Consequently, the insertion process becomes complicated in order to prevent the center deviation.

Therefore, one object of the present invention is to provide a canister vent valve mounting structure that enables the canister to be shared by different vehicle models and prevents center deviation of the insertion hole of the canister and the vent valve when the canister vent valve is connected to the canister.

The foregoing object is basically attained by providing a canister vent valve mounting structure comprising a first and second vent valve connecting sections and a sealing member. The first vent valve connecting section is adapted to be coupled to a canister configured to adsorb fuel vapors produced inside a fuel tank. The first vent valve connecting section also includes an insertion hole. The second vent valve connecting section is adapted to be coupled to a canister vent valve configured to introduce outside air into the canister. The second vent valve connecting section also includes a connecting pipe part that fits into the insertion hole. The sealing member is configured to seal a space between the connecting pipe part and the insertion hole when the first and second vent valve connecting sections are coupled together. One of the first and second vent valve connecting sections includes a plurality of mating projections that are circumferentially spaced apart near the tip thereof. The other of the first and second vent valve connecting sections includes a protrusion with a plurality of mating notches into which the mating projections are inserted. The mating projections and the mating notches are configured to mate with each other such that the protrusion engages the projections upon relative rotational movement of the first and second vent valve connecting sections. The first and second vent valve connecting sections include a rotation regulating structure configured to selectively retain the first and second vent valve connecting sections in at least two different angular positions relative to each other.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
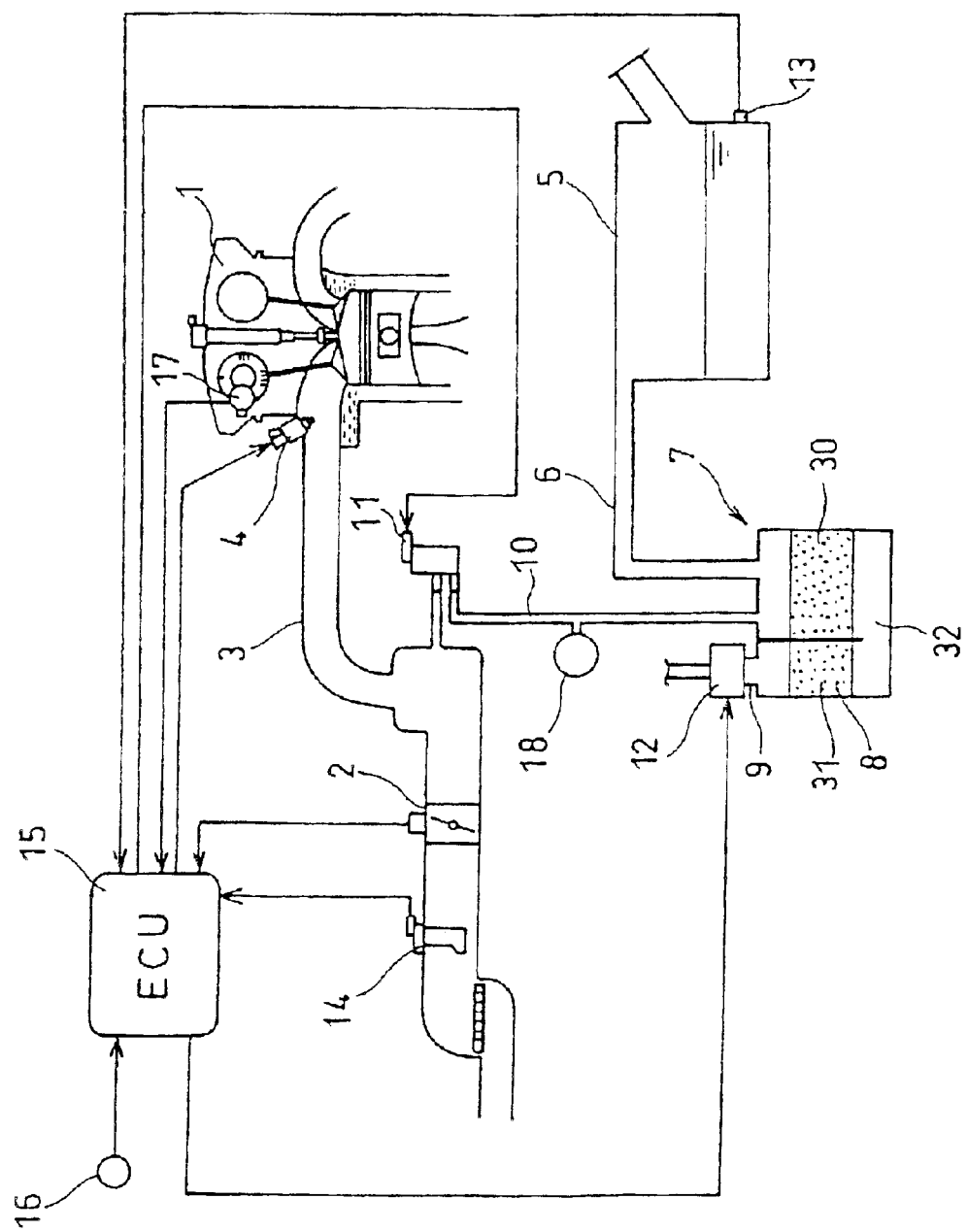
FIG. 1 is a schematic view of a fuel vapor gas treatment system utilizing a canister vent valve mounting structure in accordance with a first embodiment of the present invention.

Referring initially to FIG. 1, an overall fuel vapor gas treatment system is diagrammatically illustrated to explain the present invention. The fuel vapor gas treatment system illustrated in FIG. 1 utilizes a canister vent valve mounting structure for connecting a canister 7 with a canister vent valve 12 such that the canister vent valve 12 can be selectively mounted in two positions in accordance with the first embodiment of the present invention. The fuel vapor gas treatment system basically comprises an engine 1, a fuel tank 5, an engine control unit 15 (herein after "ECU 15") and the canister 7. The canister 7 is a fuel vapor treatment device that temporarily adsorbs fuel vapors that are produced inside a fuel tank 5. Accordingly, the canister 7 is a container filled with an adsorbent material 8, such as activated carbon. The canister 7 is provided with a fresh air inlet 9 thorough which the outside air is introduced into the canister 7. The canister vent valve 12 is fixedly coupled to the fresh air inlet 9 of the canister 7. More specifically, the canister 7 includes a first vent valve connecting section that is configured to be rotationally coupled to a second vent valve connecting section of the canister vent valve 12. The first vent valve connecting section of the canister 7 and the second vent valve connecting section of the canister vent valve 12 form the canister vent valve mounting structure. As explained below in more detail, the first and second vent valve connecting sections are rotationally coupled together such that the canister vent valve 12 is selectively retained in two different angular positions relative to the canister 7. The canister vent valve 12 also works as a leak diagnosis device for the fuel vapor treatment device.

The canister 7 further includes a fuel vapor guide passage 6 and a purge passage 10. The fuel vapor guide passage 6 is a passage through which the fuel vapors produced in the fuel tank 5 are drained into the canister 7. The purge passage 10 is fluidly connected to an intake pipe 3 downstream of a throttle valve 2 through a purge control valve 11. The purge control valve 11 opens in response to signals outputted from the ECU 15.

Thus, when the engine 1 is not running, fuel vapors produced inside the fuel tank 5 are directed by the fuel vapor guide passage 6 to the canister 7. The adsorbent material 8 of the canister 7 temporarily adsorbs the fuel vapors from the fuel tank 5. When the engine 1 is started and prescribed purge permission conditions are satisfied, the purge control valve 11 opens and a negative intake pressure of the engine 1 acts on the canister 7. As a result, fresh air introduced through the fresh air inlet 9 causes the fuel vapors to separate from the adsorbent material 8. A purge gas containing the separated fuel vapors is drawn into the intake pipe 3 through the purge passage 10, and is then combusted in the combustion chambers of the engine 1.

As illustrated in FIG. 1, the engine 1 is provided with an air intake system including the throttle valve 2 that controls an air intake rate. The intake pipe 3 is located downstream of the throttle valve 2, and includes a manifold part provided with a plurality of solenoid type fuel injection valves 4 (shown only one in FIG. 1). Each cylinder of the engine 1 is provided with one of the fuel injection valves 4. The fuel injection valves 4 open and inject fuel in response to a drive pulse signal that is outputted from the ECU 15 in synchronization with the engine rotation. The injected fuel is combusted inside the combustion chambers of the engine 1. These components comprising of the air intake system are conventional components that are well known in the art. Since these components are well known in the art, these structures will not be discussed or illustrated in detail herein.

The ECU 15 preferably includes a microcomputer that includes a CPU with a control program that controls the fuel vapor treatment apparatus as discussed below. The ECU 15 also includes other conventional components such as an input interface circuit, an output interface circuit, an A/D converter, and storage devices such as a ROM (Read Only Memory) device and a RAM (Random Access Memory)

device. The internal RAM of the ECU 15 stores statuses of various control data. The ECU 15 is operatively coupled to the purge control valve 11 and the canister vent valve 12 in a conventional manner, and is programmed to control the opening and closing of the purge control valve 11 and the canister vent valve 12. It will be apparent to those skilled in the art from this disclosure that the precise structure and algorithms for ECU 15 can be any combination of hardware and software that will carry out the functions of the present invention. In other words, "means plus function" clauses as utilized in the specification and claims should include any structure or hardware and/or algorithm or software that can be utilized to carry out the function of the "means plus function" clause.

The ECU 15 receives various input signals from various sensors. In particular, the ECU 15 is operatively coupled to an air flow meter 14, a vehicle speed sensor 16, a fuel temperature sensor 13, a crank angle sensor 17, and a pressure sensor 18. The airflow meter 14 detects the intake airflow rate and produces an input signal indicative of an intake air flow rate, which is sent to the ECU 15. The vehicle speed sensor 16 detects the vehicle speed and produces an input signal indicative of a vehicle speed, which is sent to the ECU 15. The fuel temperature sensor 13 detects the temperature of the fuel inside fuel tank 5 and produces an input signal indicative of a temperature of the fuel inside fuel tank 5, which is sent to the ECU 15. The crank angle sensor 17 detects the rotational position of the crankshaft and produces an input signal indicative of a rotational position of the crankshaft, which is sent to the ECU 15. The crank angle sensor 17 produces the input signal indicative of the rotational position of the crankshaft in synchronization with the engine rotation, thus enables the engine speed to be detected. The pressure sensor 18 detects the pressure in the purge passage 10 and produces an input signal indicative of a pressure in the purge passage 10, which is sent to the ECU 15.

The ECU 15 executes a leak diagnosis of the fuel vapor treatment system as follows. The ECU 15 closes the canister vent valve 12 based on engine operating condition signals received from the aforementioned sensors. The ECU 15 controls the operation of the purge control valve 11 such that negative pressure produced in the intake pipe 3 is introduced to a vapor passage space that includes the purge passage 10, the canister 7, and the fuel tank 5. Subsequently, the ECU 15 closes the purge control valve 11 so that the aforementioned vapor passage space becomes a closed space. The pressure sensor 18 detects the pressure of the space and produces an input signal indicative of the pressure, from which the ECU 15 detects a change in pressure in the vapor passage space. Accordingly, the ECU 15 determines if there is a leak based on the magnitude of the pressure change within a prescribed amount of time.

Figure 2:
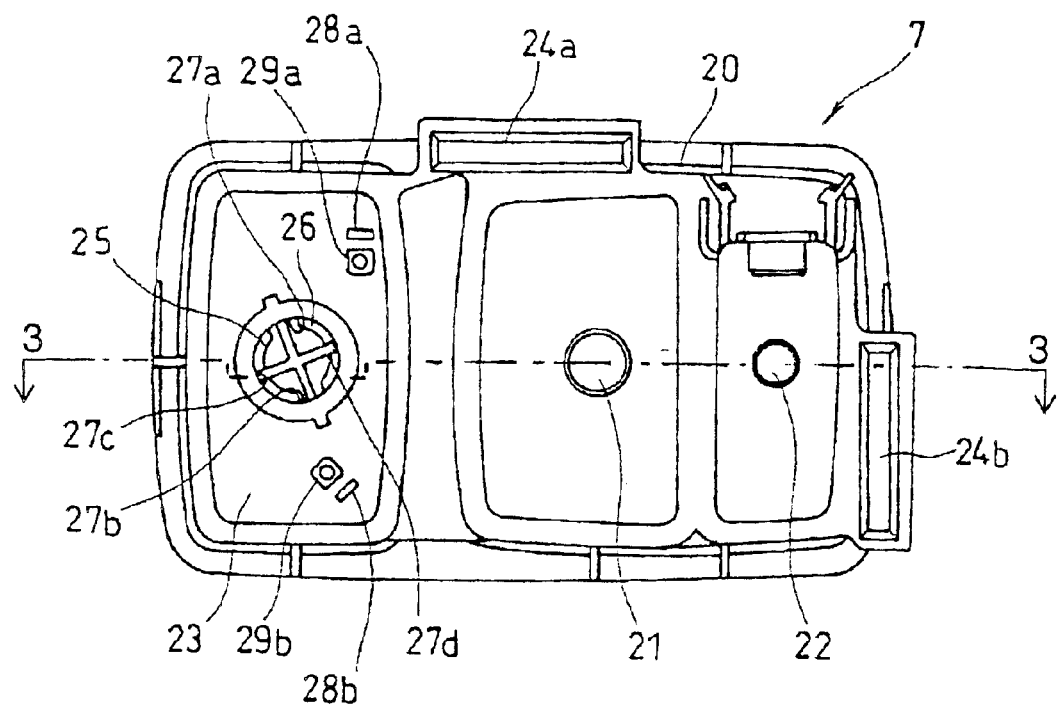
FIG. 2 is a front side elevational view of a canister in accordance with the first embodiment of the present invention.
Figure 3:
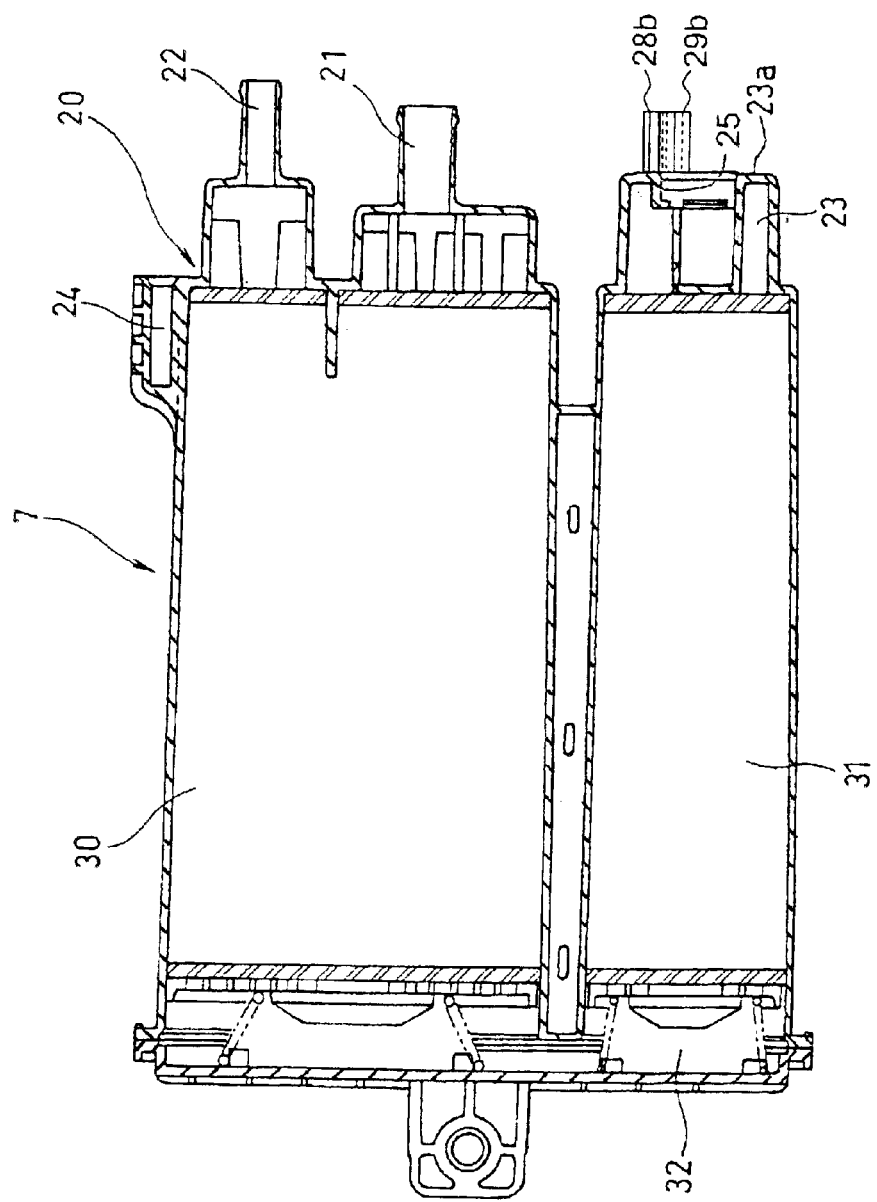
FIG. 3 is a cross sectional view of the canister illustrated in FIG. 2, as seen along section line 3—3 of FIG. 2, in accordance with the first embodiment of the present invention.
Figure 4:
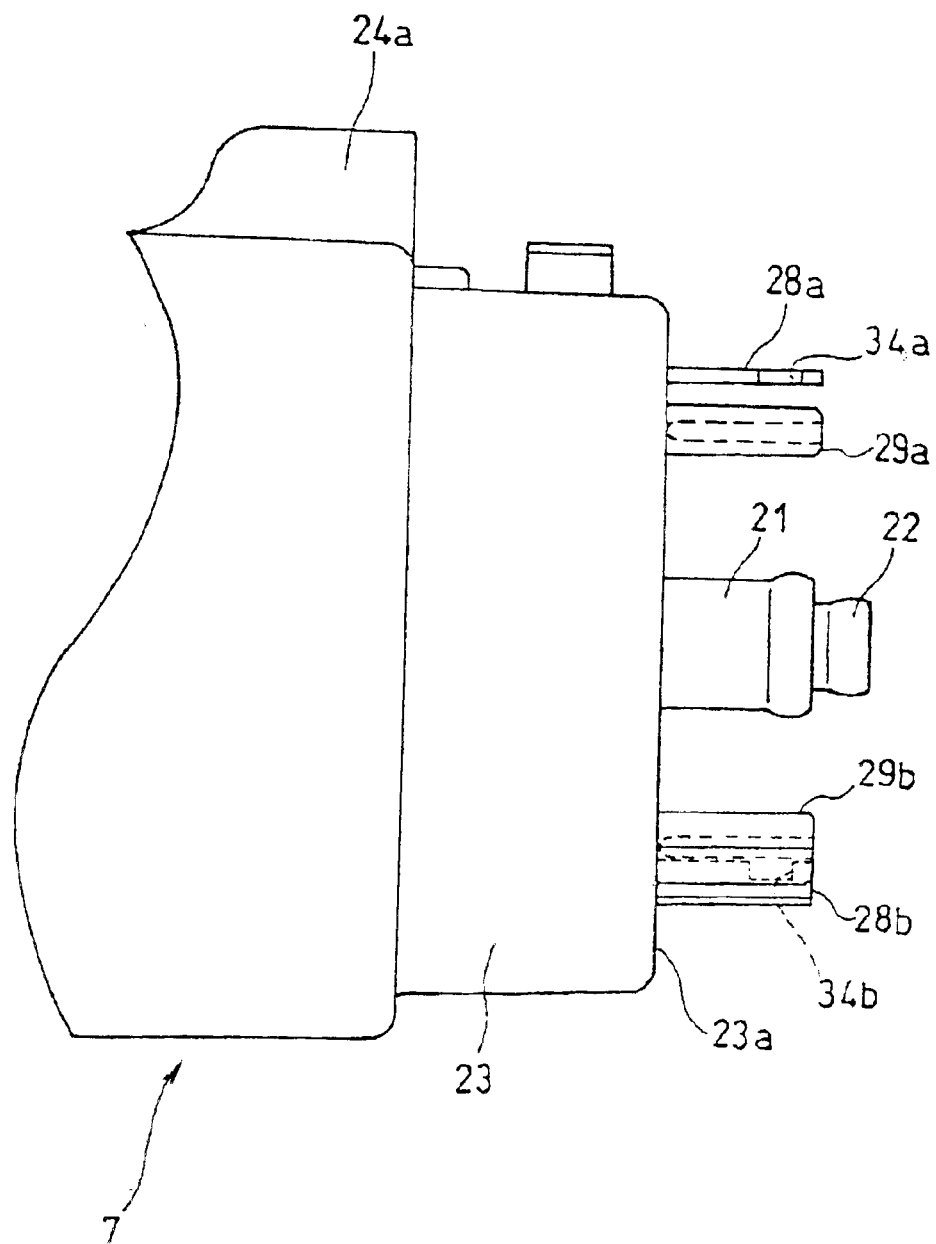
FIG. 4 is an enlarged, partial left side elevational view of the canister illustrated in FIGS. 2 and 3 in accordance with the first embodiment of the present invention.

Referring now to FIGS. 2–4, the canister 7 that includes the first vent valve connecting section will be further explained in accordance with the first embodiment of the present invention. The canister 7 is an airtight container as shown in FIG. 3. The canister 7 also includes a side wall 20 comprising a charge port 21, a purge port 22 and a vent port 23. The charge port 21 is fluidly connected to the fuel vapor guide passage 6 to direct fuel vapors produced inside the fuel tank 5 into the canister 7. The purge port 22 is fluidly connected to the purge passage 10 to drain the purge gas containing the fuel vapors into the intake pipe 3. The vent port 23 serves as the fresh air inlet 9 to which the canister vent valve 12 is mounted to introduce outside air into the canister 7.

FIG. 3 shows a cross section of the canister 7 as seen along section line 3—3 of FIG. 2. The inside of the canister 7 is partitioned into a first adsorption chamber 30 and a second adsorption chamber 31 that are both filled with the adsorbent material 8. The first absorption chamber 30 is formed on the same side that the charge port 21 and the purge port 22 are formed. The second adsorption chamber 31 is formed on the same side that the vent port 23 is formed. The first and second adsorption chambers 30 and 31 are filled with the adsorbent material 8 that adsorbs fuel vapors produced in the fuel tank 5. The first adsorption chamber 30 and the second absorption chamber 31 are linked with each other through a communication chamber 32, which is also formed inside the canister 7. Therefore, the first adsorption chamber 30 and the second adsorption chamber 31 are essentially connected in series by the communication chamber 32 disposed therebetween.

The canister 7 is also provided with two vehicle mounting portions 24a and 24b that open toward the side wall 20, as shown in FIG. 2. The vehicle mounting portions 24a and 24b are portions into which a canister support member (not shown) of the vehicle fits when the canister 7 is mounted to the vehicle. The canister support member is a flange shaped member that is sized, arranged and configured to be snuggly received within the vehicle mounting portions 24a and 24b. Suitable fastening structure can be used to selectively retain the canister support member within the vehicle mounting portions 24a and 24b. The canister support member is inserted into one of the vehicle mounting portions 24a and 24b and the canister 7 is fastened to the vehicle in such an orientation that it hangs down from the canister support member. In other words, the canister 7 is mounted to the vehicle by orienting the canister 7 such that one of the vehicle mounting portions 24a and 24b is located on top relative to the upward direction of the vehicle. Then, the vehicle mounting portion 24a or 24b, which is located on top of the canister 7 in this orientation, is inserted onto the canister support member.

As best seen in FIG. 2, the vent port 23 includes an end surface 23a with an insertion hole 25 into which a connecting pipe part 41 of the canister vent valve 12 is inserted. A flange shaped protrusion 26 is formed on an inside circumferential surface of the insertion hole 25. The protrusion 26 is provided with a first pair of substantially 180 degrees apart mating notches 27a and 27b and a second pair of substantially 180 degrees apart mating notches 27c and 27d that divide the protrusions 26 into four retaining sections. The insertion hole 25, the protrusion 26, the mating notches 27a, 27b, 27c and 27d together basically constitute the first vent valve connecting section of the canister 7. While the first vent valve connection section is preferably an integrated structure, it will be apparent to those skilled in the art from this disclosure that the first vent valve connecting section can be a separable unit that can be separate from the rest of the canister 7.

The mating notches 27a and 27b are in positions displaced through a prescribed angle in the counterclockwise direction with respect to the vertical direction of the vehicle (the top to bottom direction of the paper with FIG. 2). The mating notches 27c and 27d are formed in positions displaced through the prescribed angle in the counterclockwise direction with respect to the traverse direction of the vehicle (the right to left direction of the paper with FIG. 2). Accordingly, these four mating notches 27a, 27b, 27c and 27d are separated from each other by substantially 90 degrees. Preferably, the pair of the mating notches 27a and 27b is different in size from the pair of the mating notches 27c and 27d to restrict insertion angles of the canister vent valve 12 with respect to the canister 7. In the first embodiment, the mating notches 27a and 27b are slightly wider than the mating notches 27c and 27d in circumferential direction of the protrusion 26.

The side wall 20 also includes a pair of stoppers 28a and 28b and a pair of breaking prevention ribs or elements 29a and 29b in an outer circumferential area of the insertion hole 25. The stoppers 28a and 28b are preferably long, narrow shaped plates that include catch parts with notches 34a and 34b, respectively, as shown in FIG. 4. The stoppers 28a and 28b are cantilevered members with a limited degree of flexibility such that they can bend from their base parts that are connected to the side wall 20. As a result, the notches 34a and 34b are selectively engaged with a claw part 46 of the canister vent valve 12. As discussed more in detail below, the stoppers 28a and 28b together with the claw part 46 of the canister vent valve 12 constitute a rotation regulating mechanism or structure that determines the angular positions of the canister vent valve 12 respective to the canister 7 when the canister vent valve 12 and the canister 7 are coupled together. Moreover, the stoppers 28a and 28b, and the breaking prevention ribs 28a and 28b together can be considered part of the first vent valve connecting section. Furthermore, the stoppers 28a and 28b can be considered to be either first or second retaining members of the first vent valve connecting section.

The canister vent valve 12 is retained in a first position relative to the canister 7 using the stopper 28a (as explained below), when the canister 7 is mounted to the vehicle using the vehicle mounting portion 24a. The stopper 28a is located in a first position relative to the mating notches 27a and 27b such that the stopper 28a engages the canister vent valve 12 (as explained below), when the canister 7 is mounted to the vehicle using the vehicle mounting portion 24a. In other words, when the canister 7 has been mounted to the vehicle such that the vehicle mounting portion 24a is positioned on top relative to the upward direction of the vehicle, the canister vent valve 12 is mounted to the canister 7 such that the canister vent valve 12 engages the stopper 28a. Alternatively, the canister vent valve 12 is retained in a second position relative to the canister 7 using the stopper 28b (as explained below), when the canister 7 is mounted to the vehicle using the vehicle mounting portion 24b. The stopper 28b is located in a second position relative to the mating notches 27a and 27b such that the stopper 28b engages the canister vent valve 12 (as explained below), when the canister 7 is mounted to the vehicle by using the vehicle mounting portion 24b. In other words, when the canister 7 has been mounted to the vehicle such that the vehicle mounting portion 24b is positioned on top relative to the upward direction of the vehicle, the canister vent valve 12 is mounted to the canister 7 such that the canister vent valve 12 engages with the stopper 28b. Accordingly, in each case where either the vehicle mounting portions 24a or 24b is used to mount the canister 7 to the vehicle, the canister vent valve 12 is fixedly coupled to the canister 7 at a position where the center axis of a main body of the canister vent valve 12 is substantially aligned with a vertical direction of the vehicle.

Furthermore, the stoppers 28a and 28b are disposed closely adjacent to the breaking prevention ribs 29a and 29b, respectively, that are also provided on the end surface 23a. The breaking prevention ribs 29a and 29b are preferably hollow, square rod shaped members. The breaking prevention ribs 29a and 29b protrude outwardly from the end surface 23a by substantially the same amount as the stoppers 28a and 28b protrude outwardly from the end surface 23a, as shown in FIGS. 3 and 4. The distances between the breaking prevention ribs 29a and 29b and stoppers 28a and 28b, respectively, are set such that the braking prevention ribs 29a and 29b prevent the stoppers 28a and 28b from breaking due to excessive bending deformation by the claw part 46.

Figure 5:
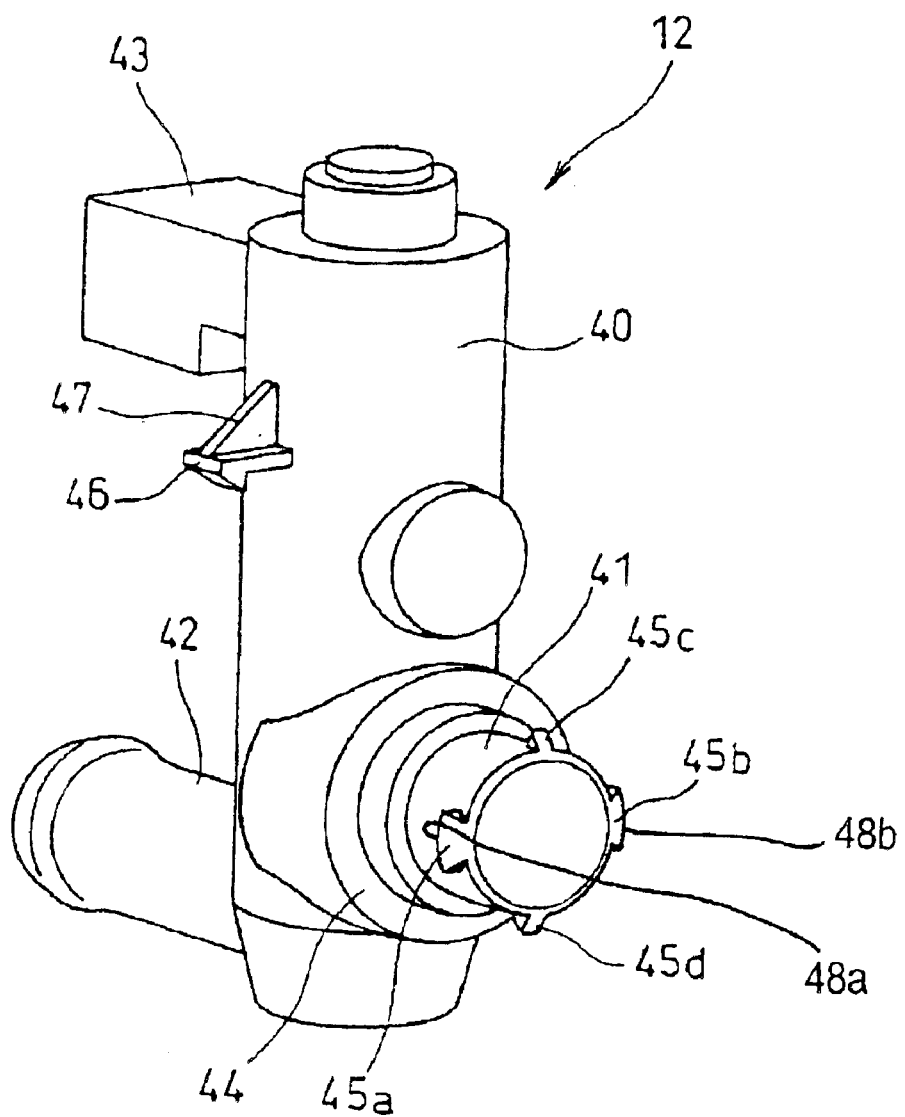
FIG. 5 is a perspective view of a vent valve in accordance with the first embodiment of the present invention.

Referring now to FIGS. 5–8, the canister vent valve 12 that includes the second vent valve connection section will be explained in accordance with the first embodiment of the present invention. An outer surface of the canister vent valve 12 basically comprises a main body part 40, a connecting pipe part 41 and an outside air intake pipe part 42, as shown in FIG. 5. The main body part 40, the connecting pipe part 41 and the outside intake pipe part 42 are substantially circular-tube-shaped members. The connecting pipe part 41 is configured to fit into the insertion hole 25 formed in the vent port 23 of the canister 7. The connecting pipe part 41 extends from the lower end of the main body part 40 in a direction perpendicular to the longitudinal center axis of the main body part 40. The outside air intake pipe part 42 is configured to be coupled with an outside air intake port (not shown). The outside air intake pipe part 42 extends from the lower end of the main body part 40 in a direction that is perpendicular to the longitudinal center axis of the main body part 40, and 180 degrees opposite to the direction in which the connecting pipe part 41 extends. The main body part 40 is further provided with a connector 43 and a flange face 44. The connector 43 is preferably formed on an upper end of the main body part 40. The connector 43 is electrically connected to a vehicle battery that supplies an electric current to the canister vent valve 12. The flange face 44 is formed on a lower end of the main body part 40. The flange face 44 is configured to abut against the end surface 23a of the vent port 23 when the canister vent valve 12 is mounted to the canister 7.

The connecting pipe part 41 includes four mating projections 45a, 45b, 45c and 45d on the outside circumference of the connecting pipe part 41 near the tip thereof. The connecting pipe part 41 and the mating projections 45a, 45b, 45c and 45d together basically constitute the second vent valve connecting section. The mating projections 45a, 45b, 45c and 45d are spaced generally equally in the circumferential direction of the connecting pipe part 41, and protrude outwardly from the connecting pipe part 41. More specifically, the mating projections 45a and 45b are positioned substantially 180 degrees opposite each other along a direction perpendicular to the longitudinal center axis of the main body part 40 and the mating projections 45c and 45d are positioned substantially 180 degrees opposite each other along a direction parallel to the longitudinal center axis of the main body part 40. Accordingly, the four mating projections 45a, 45b, 45c and 45d are separated from each other by substantially 90 degrees. Preferably, the mating projections 45a and 45b are configured such that they are complementary only to the mating notches 27a and 27b of the insertion hole 25 of the canister 7, and the mating projections 45c and 45b are configured such that they are complementary only to the mating notches 27c and 27d of the insertion hole 25 of the canister 7. In the first embodiment, the mating notches 27a and 27b are slightly wider than the mating notches 27c and 27d in the circumferential direction of the protrusion 26. Thus, the mating projections 45a and 45b are also configured to be slightly wider than the mating projections 45c and 45d in a circumferential direction of the connecting pipe part 41. Accordingly, the mating projections 45a, 45b, 45c and 45d together with the mating notches 27a, 27b, 27c and 27d restricts the insertion positions in which the connecting pipe part 41 of the canister vent valve 12 can be inserted into the insertion hole 25 of the canister 7. More specifically, in the first embodiment, there are only two possible insertion positions for the connecting pipe part 41 of the canister vent valve 12 to be inserted into the insertion hole 25. The first position is where the mating projections 45a, 45b, 45c and 45d are aligned with the mating notches 27a, 27b, 27c and 27d, respectively. The second position is where the mating projections 45a, 45b, 45c and 45d are aligned with the mating notches 27b, 27a, 27d and 27c, respectively.

Furthermore, the mating projections 45a, 45b, 45c and 45d are preferably configured to protrude from the connecting pipe part 41 by lengths that are substantially equal to each other. Moreover, the end faces of the mating projections 45a, 45b, 45c and 45d are preferably positioned on an imaginary circle so that diameter of the imaginary circle is substantially equal to an inside diameter of the protrusion 26 formed on the inside circumferential surface of the insertion hole 25 of the canister 7. Accordingly, the connecting pipe part 41 is inserted into the insertion hole 25 such that the mating projections 45a, 45b, 45c and 45d are aligned with the mating notches 27a, 27b, 27c and 27d, respectively. Thus, the center positions of the connecting pipe part 41 and the insertion hole 25 are automatically aligned. Alternatively, the connecting pipe part 41 is inserted into the insertion hole 25 such that the mating projections 45a, 45b, 45c and 45d are aligned with the mating notches 27b, 27a, 27d and 27c, respectively. Thus, the center positions of the connecting pipe part 41 and the insertion hole 25 are again automatically aligned. Of course, it will be apparent to those skilled in the art from this disclosure that various dimensional relationships among the mating projections 45a, 45b, 45c and 45d and the mating notches 27a, 27b, 27c and 27d can be used to carry out the present invention. Moreover, it will be apparent to those skilled in the art from this disclosure that the canister 7 and the canister vent valve 12 can be modified such that the canister 7 has a male vent valve connecting section and the canister vent valve 12 has a female vent valve connecting section. Also, it will be further apparent to those skilled in the art from this disclosure that the mating structures of the canister 7 and the canister vent valve 12 can be modified in other ways. For example, the insertion hole 25 of the canister 7 can have projections and the connecting pipe part 41 can have notches.

Moreover, the mating projections 45a and 45b includes mating projection surfaces 48a and 48b, respectively, that contact the underside surface of the protrusion 26 when the canister 7 and the canister vent valve 12 are coupled together. The flange surface 44 and the mating projection surfaces 48a and 48b of the mating projections 45a and 45b, respectively, are axially spaced apart such that the canister vent valve 12 is retained with the insertion hole 25 against axial movement relative to the canister 7. In this first embodiment, only the mating projections 45a and 45b including the mating projection surfaces 48a and 48b, respectively, are configured to engage with the protrusion 26 in order to fix the position of the canister vent valve 12 with respect to the direction in which the connecting pipe part 41 is inserted into the insertion hole 25 (i.e., the direction perpendicular to the surface of the paper in FIG. 2). Of course, it will be apparent to one skilled in the art from this disclosure that the canister vent valve 12 can be configured such that the mating projections 45c and 45d also engage the protrusion 26 in the same manner in which the mating projections 45a and 45b engage the protrusion 26.

Figure 6:
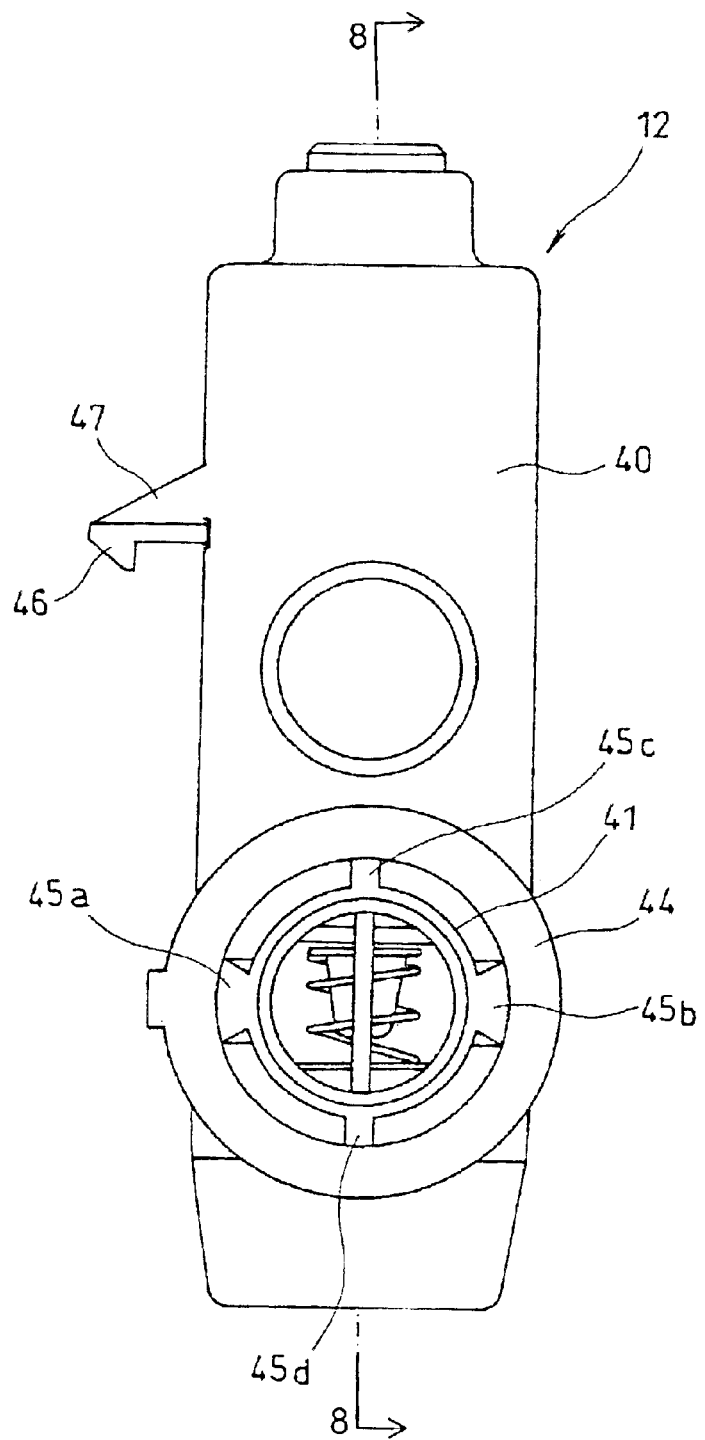
FIG. 6 is an enlarged front elevational view of the vent valve illustrated in FIG. 5 in accordance with the first embodiment of the present invention.
Figure 7:
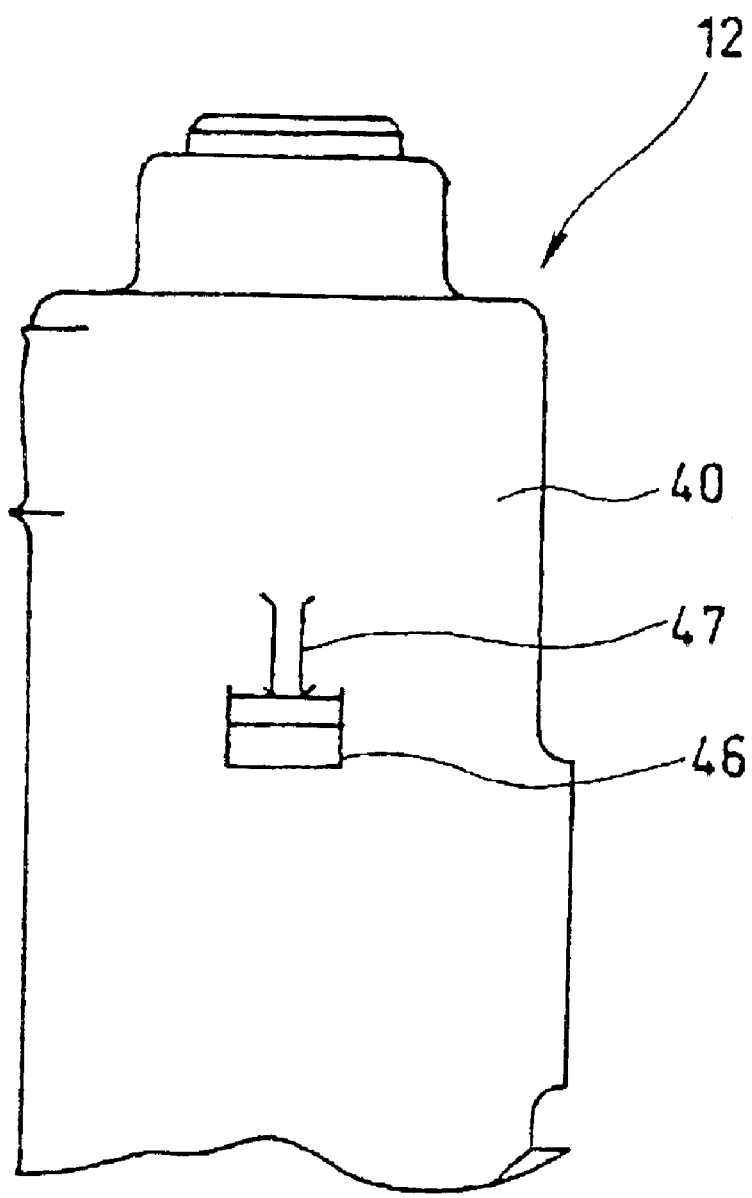
FIG. 7 is a partial left elevational view of the vent valve illustrated in FIGS. 5 and 6 in accordance with the first embodiment of the present invention.

As shown in FIG. 6, the main body part 40 includes the claw part 46 that is configured to engage with one of the stoppers 28a or 28b of the canister 7. The claw part 46 extends in a direction perpendicular to both the longitudinal center axis of the main body part 40 and the longitudinal center axis of the connecting pipe part 41 as shown in FIG. 6. Also, the claw part 46 is preferably supported by a rib 47. The claw part 46, the stoppers 28a and 28b constitute the rotation regulating mechanism or structure that defines two different angular positions of the canister vent valve 12 respective to the canister 7 when the canister vent valve 12 is mounted to the canister 7 in accordance with the first embodiment of the present invention. The claw part 46 can be considered a first or second retaining member that mates with the stoppers 28a and 28b which are also retaining members. Either the claw part 46 or the stoppers 28a and 28b can be considered to be a first retaining member and the other be considered a second retaining member. In other words, claw parts can be used in place of the stoppers 28a and 28b on the canister 7, and a stopper can be used in place of the claw part 46 on the canister vent valve 12. In any event, the first and second retaining members are complementary members that fixedly engage with each other to retain the canister vent valve 12 to the canister 7.

The connecting pipe part 41, the mating protrusions 45a, 45b, 45c and 45d, and the flange face 44 basically constitute the second vent valve connecting section that is coupled to the first vent valve connecting section of the canister 7. The canister vent valve 12 and the second vent valve connecting section are preferably a unitary, integrated structure. Of course, it will be apparent to one skilled in the art from this disclosure that the second connecting valve section can be a separable unit that can be separate from the rest of the canister vent valve 12. Moreover, the claw part 46, the rib 47 and a portion of the main body part 40 can be considered part of the second vent valve connecting section.

Figure 8:
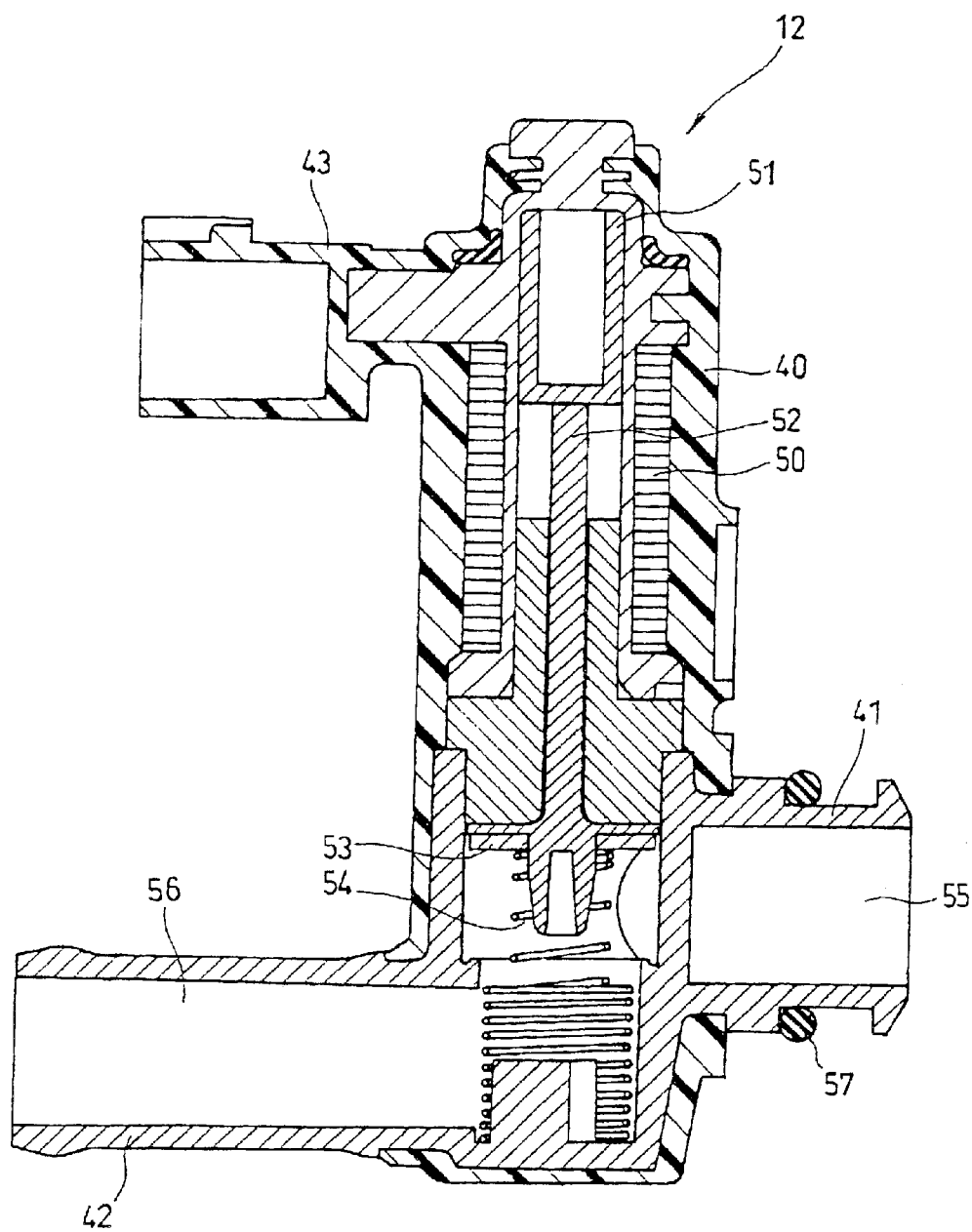
FIG. 8 is a cross sectional view of the vent valve illustrated in FIGS. 5–7, as seen along section line 8—8 of FIG. 6, in accordance with the first embodiment of the present invention.

FIG. 8 shows a cross sectional view of the canister vent valve 12. The inside of the canister vent valve 12 basically comprises a coil 50, an armature 51, a plunger 52, a seal 53 and a spring 54. The coil 50 installed inside the main body part 40 converts the electric current supplied by the connector 43 into an electromagnetic force and operates the armature 51. The bottom surface of the armature 51 contacts the upper end face of the plunger 52. The plunger 52 has the seal 53 mounted at its lower end face, and the spring 54 at the bottom. When the armature 51 operates, the plunger 52 is pushed down against the elastic force of the spring 54 and a passage 55 inside the connecting pipe part 41 and a passage 56 inside the outside air intake part 42 are shut off from each other by the seal 53. Accordingly, the flow of outside air into the canister 7 is shut off. An O-ring or sealing member 57 is installed on the outside of the connecting pipe part 41 and serves as a seal member that seals the space between the outside circumference of the connecting pipe part 41 and the inside circumference of the insertion hole 25 when the connecting pipe part 41 is inserted into the insertion hole 25.

Now the mounting of the canister 7 and the canister vent valve 12 together will be explained in more detail. When the canister support member (not shown) is inserted into the vehicle mounting portion 24a, the canister 7 is oriented as shown in FIG. 2. The canister vent valve 12 is brought up to the canister 7 in such a manner that the upper end of the canister vent valve 12 points substantially in the upward direction (top of the paper) of FIG. 2. The main body part 40 of the canister vent valve 12 is tilted counterclockwise about the center axis of the connecting pipe part 41 such that the mating projections 45a, 45b, 45c and 45d are aligned with the mating notches 27a, 27b, 27c and 27d, respectively, that are formed in the protrusion 26 of the insertion hole 25. Then, the connecting pipe part 41 is inserted into the insertion hole 25. After the flange face 44 abuts against the end surface 23a of the vent port 23, the canister vent valve 12 is rotated clockwise relative to the insertion hole 25 about the center axis of the connecting pipe part 41. Accordingly, the sealing member 57 is compressed and the mating projection surfaces 48a and 48b of the mating projections 45a and 45b contact the underside surface of the protrusion 26 such that at least the mating projections 45a and 45b engage with the protrusion 26. Thus, the position of the canister vent valve 12 is fixed with respect to the direction in which the connecting pipe part 41 is inserted into the insertion hole 25 (i.e., the direction perpendicular to the surface of the paper with FIG. 2). Meanwhile, the claw part 46 engages with the stopper 28a so that the mounting angle of the canister vent valve 12 with respect to the canister 7 is fixed. As a result, the upper end of the main body part 40 (the end part of the main body part 40 where the connector 43 is located) is positioned higher than the connecting pipe part 41 relative to the upward direction of the vehicle. Moreover, the center axis of the main body part 40 is substantially parallel to the vertical direction of the vehicle (the vertical direction in FIG. 2).

Alternatively, when the canister support member (not shown) is inserted into vehicle mounting portion 24b, the canister 7 is oriented such that the canister 7 in FIG. 2 is rotated 90 degrees counterclockwise. The canister vent valve 12 is brought up to the canister 7 in such a manner that the upper end of the canister vent valve 12 points horizontally in the rightward direction of FIG. 2. The main body part 40 of the canister vent valve 12 is tilted counterclockwise about the center axis of the connecting pipe part 41 such that the mating projections 45a, 45b, 45c and 45d are aligned with the mating notches 27b, 27a, 27d and 27c, respectively, that are formed in protrusion 26. Then, the connecting pipe part 41 is inserted into the insertion hole 25. After the flange face 44 abuts against the end surface 23a of the vent port 23, the canister vent valve 12 is rotated clockwise relative to the insertion hole 25 about the center axis of the connecting pipe part 41. Accordingly, the sealing member 57 is compressed and the surfaces 48a and 48b of the mating projections 45a and 45b contact the underside surface of the protrusion 26 such that at least the mating projections 45a and 45b engage with the protrusion 26. Thus, the position of the canister vent valve 12 is fixed with respect to the direction in which the connecting pipe part 41 is inserted into the insertion hole 25 (i.e., the direction perpendicular to the surface of the paper with FIG. 2). Meanwhile, the claw part 46 is engaged with the stopper 28b so that the mounting angle of the canister vent valve 12 with respect to the canister 7 is fixed. As a result, the upper end of the main body part 40 (the end part of the main body part 40 where the connector 43 is located) is positioned higher than the connecting pipe part 41 relative to the upward direction of the vehicle. Moreover, the center axis of the main body part 40 is substantially parallel to the vertical direction of the vehicle (the right to left direction of the paper with FIG. 2).

If the center axis of the main body part 40 becomes tilted relative to the vertical direction of the vehicle when the canister vent valve 12 is mounted to a vehicle, there is a risk that the friction between the armature 51 and the internal surface of the coil 50 will increase. Accordingly, even if the upper end of the main body part 40 (i.e., the end part of the main body part 40 where the connector 43 is located) is positioned higher relative to the upward direction of the vehicle, smooth operation of the canister vent valve 12 will be impaired when the center axis of the main body part 40 becomes too tilted relative to the vertical direction of the vehicle.

Moreover, if the upper end of the main body part 40 is positioned lower than the connecting pipe part 41 (which is attached to the canister 7), there will be a risk that dirty water and the like that enters the outside air intake part 42 through the passage 56 will pass through the gap surrounding the plunger 52 and reach the armature 51, causing rust to develop. Also, if the center axis of the main body part 40 deviates greatly from the vertical direction of the vehicle, gravity will pull the armature 51 in the direction of opening the canister vent valve 12. Consequently, there will be a risk that the electromagnetic force of the coil 50 will be insufficient and the canister vent valve 12 will experience reduced valve closing speed or an inability to achieve the closed state. There will also be a risk that the sealing performance of the seal 53 will degrade due to a decline in surface pressure.

Therefore, it is preferred to keep the mounting angle of the canister vent valve 12 with respect to the vehicle within ±45 degrees of the vertical direction of the vehicle in order to avoid the above mentioned risks.

Furthermore, although the canister vent valve 12 used in the first embodiment is preferably a so-called solenoid valve, it will be apparent to those skilled in the art from this disclosure that a negative pressure type diaphragm valve can be used instead of the solenoid valve to carry out the present invention. As well as the solenoid valve, the negative pressure type diaphragm valve usually has limitations on the mounting angle respective to the vertical direction of the vehicle when it is used as the canister vent valve 12. In the case of the negative pressure type diaphragm valve, it is generally specified that the diaphragm valve must be mounted such that the negative pressure chamber is on top in order to ensure the operating performance, ensure the cleanliness of the diaphragm air chamber, and prevent degradation of the diaphragm material. Accordingly, it is preferred to keep the mounting angle of the canister vent valve 12 with respect to the vehicle within a predetermined operating range relative to the vertical direction of the vehicle when a negative pressure type diaphragm valve is used as the canister vent valve 12.

According to the first embodiment of the present invention, the canister vent valve mounting structure is configured to include the canister 7 and the canister vent valve 12 that provide two possible mounting angles of the canister vent valve 12 with respect to the canister 7. Therefore, the mounting angle of the canister vent valve 12 with respect to the canister 7 can be selected from the two different angular positions in accordance with the mounting angle of the canister 7 with respect to a vehicle. Thus, the range of choices regarding the mounting angle of the canister 7 with respect to the vehicle is expanded. Accordingly, the canister 7 can be shared by different models of vehicle, and costs can be reduced.

Moreover, since the four mating projections 45a, 45b, 45c and 45d and the four mating notches 27a, 27b, 27c and 27d are provided for mounting the canister vent valve 12 to the canister 7, the center axial positions of the connecting pipe part 41 and the insertion hole 25 are aligned more accurately than having two projections and two notches when the connecting pipe part 41 is inserted into the insertion hole 25. Thus, pinching of the sealing member 57 caused by deviation of the center positions is reliable prevented.

Furthermore, since the breaking prevention ribs 29a and 29b are provided closely adjacent to the stoppers 28a and 28b, the stoppers 28a and 28b can be reliably prevented from bending excessively and breaking when one of the stoppers 28a and 28b and the claw part 46 are mated with each other.

Sscond Embodiment

Referring now to FIGS. 9, 10(a) and 10(b)–10(e), a canister vent valve mounting structure in accordance with a second embodiment of the present invention will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

Basically, the canister vent valve mounting structure of the second embodiment of the present invention differs from the first embodiment in that a modified canister 60 with a first vent valve connecting section and a modified vent valve 61 with a second vent valve connecting section are used. This second embodiment includes a canister vent valve mounting structure in which a mounting position of the canister vent valve 61 with respect to the canister 60 can be selected from four prescribed angular positions, as shown in FIGS. 10(b)–10(e).

Figure 9:
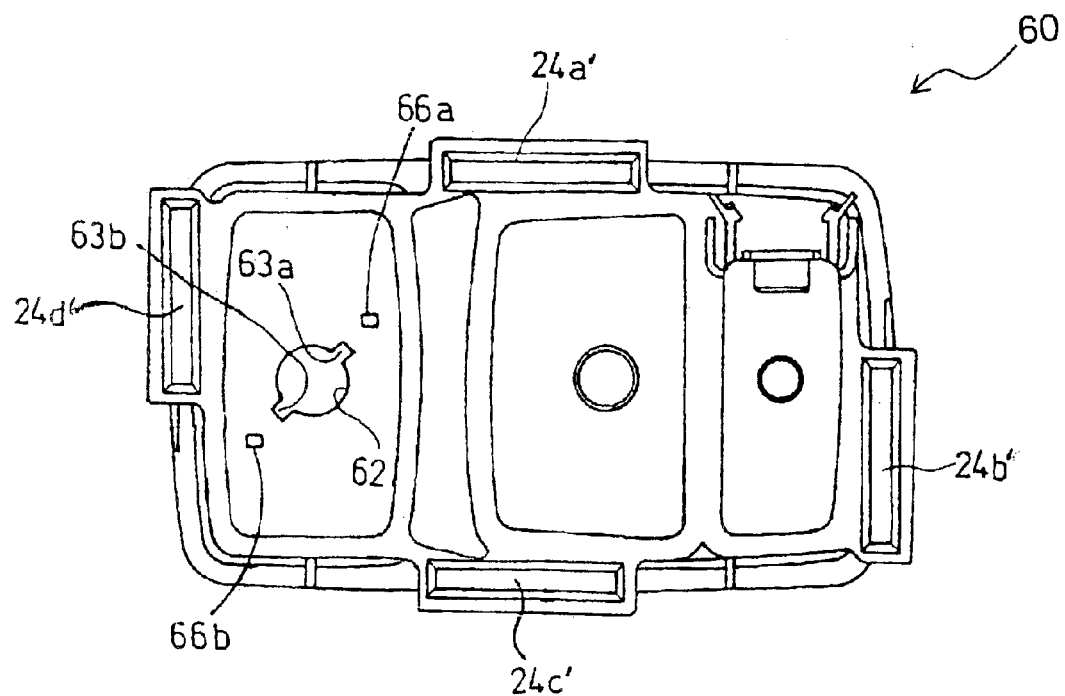
FIG. 9 is a front side elevational view of the canister in accordance with a second embodiment of the present invention.
Figure 10C:
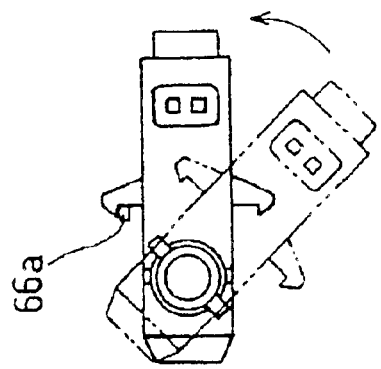
FIGS. 10(b)–(e) are partial schematic views of the canister and the vent valve illustrated in FIGS. 9 and 10(a) in accordance with the second embodiment of the present invention, showing various initial insertion positions (shown in broken lines) and final orientations (shown in full lines) of the vent valve with respect to the canister.
Figure 10E:
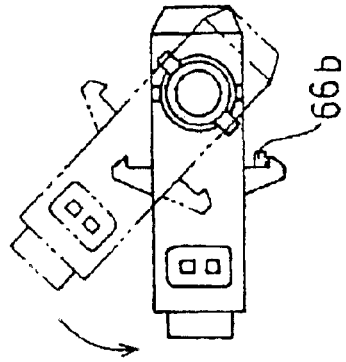
Figure 10B:
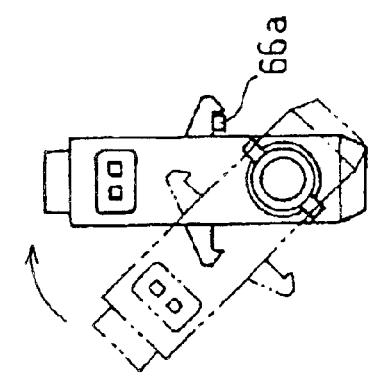
Figure 10D:
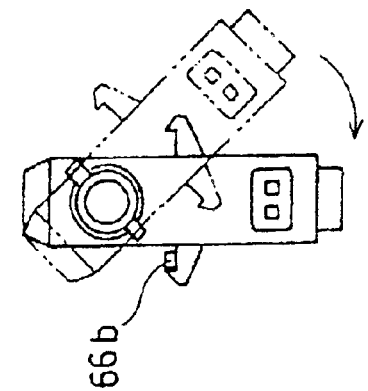
Figure 10A:
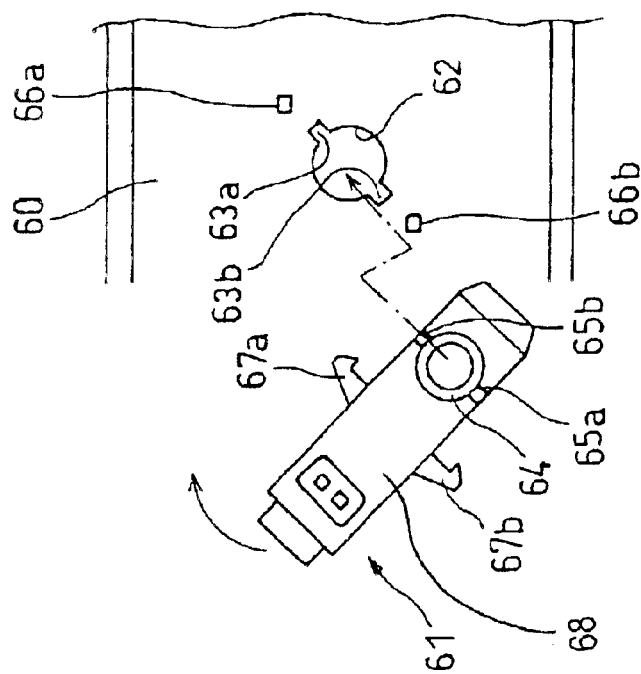
FIG. 10(a) is a partial front side elevational view of the canister illustrated in FIG. 9 and a vent valve that include a canister vent valve mounting structure in accordance with the second embodiment of the present invention.

In this second embodiment, the canister 60 basically includes four vehicle mounting portions 24a', 24b' 24c' and 24d', an insertion hole 62 with a pair of mating notches 63a and 63b, and a pair of stoppers or catch parts 66a and 66b, as shown in FIG. 9. The canister vent valve 61 basically includes a modified connecting pipe part 64 with a pair of mating projections 65a and 65b, and a pair of claw parts 67a and 67b, as shown in FIG. 10(a).

The insertion hole 62 and the mating notches 63a and 63b together basically constitute the first vent valve connecting section of the canister 60. The connecting pipe part 64 and the mating projections 65a and 65b together basically constitute the second vent valve connecting section of the canister vent valve 61 that is configured to be rotationally coupled with the first vent valve connecting section of the canister 60.

The vehicle mounting portions 24a', 24b' 24c' and 24d' are separately disposed in each of the four peripheral edges of the canister 60, respectively. Thus, the canister 60 can be selectively mounted in four different orientations relative to the vehicle.

The mating notches 63a and 63b of the canister 60 are formed on an inner circumferential rim of the insertion hole 62 in positions substantially 180 degrees apart about the center axis of the insertion hole 62. Moreover, the mating notches 63a and 63b preferably form a 45 degrees angle with respect to the canister 60 in the top to bottom direction in FIG. 2. The mating notches 63a and 63b are preferably configured to mate with the complementary mating projections 65a and 65b formed on the second vent valve connecting section of the canister vent valve 61 in the same manner as described in the first embodiment. The stoppers 66a and 66b of the canister 60 are disposed substantially 180 degrees apart about a center axis of the insertion hole 62, as seen in FIG. 9. Moreover, the stoppers 66a and 66b are preferably configured such that one of the stoppers 66a and 66b engages one of complementary retaining members or claw parts 67a and 67b of the canister vent valve 61 by bending to retain the canister vent valve 61 to the canister 60. Accordingly, the stoppers 66a and 66b can be considered either first or second retaining members that selectively engage one of the claw parts 67a and 67b to retain the canister vent valve 61 in one of the various mounting positions relative to the canister 60. Moreover, the stoppers 66a and 66b can be considered part of the first vent valve connecting section that is configured to be rotationally coupled with the second vent valve connecting section of the canister vent valve 61. Furthermore, it will be apparent to those skilled in the art from this disclosure that each of the stoppers 66a and 66b can have a break prevention rib that prevents the stoppers 66a or 66b from breaking due to excessive bending deformation.

The mating projections 65a and 65b of the canister vent valve 61 are configured to be selectively mate with the mating notches 63a and 63b of the canister 60. The claw parts 67a and 67b are disposed substantially 180 degrees apart about a center axis of a main body part 68 of the canister vent valve 61, as shown in FIG. 10(a). The claw parts 67a and 67b are configured to selectively engage with the stoppers 66a and 66b of the canister 60 to retain the canister vent valve 61 in one of the various mounting positions relative to the canister 60. Accordingly, the claw parts 67a and 67b can be considered either first or second retaining members that selectively engage with the complementary retaining members or stoppers 66a and 66b of the canister 60. Moreover, the claw parts 67a and 67b can be considered part of the second vent valve connecting section. Furthermore, the claw parts 67a and 67b of the canister vent valve 61 and the stoppers 66a and 66b of the canister 60 together constitute a rotation regulating mechanism or structure that determines the mounting angle of the canister vent valve 61 with respect to the canister 60 when the canister vent valve 61 and the canister 60 are coupled together.

FIGS. 10(b)–10(e) show schematic views of different initial insertion positions and final fixed positions of the canister vent valve 61 with respect to the canister 60 in accordance with the second embodiment of the present invention. The portions drawn with broken lines in FIGS. 10(b)–10(e) show the positions of the canister vent valve 61 when the connecting pipe part 64 of the canister vent valve 61 is inserted into the insertion hole 62 of the canister 60. After the canister vent valve 61 is inserted into the insertion hole 62, the canister vent valve 61 is rotated relative to the insertion hole 62 about the center axis of the connecting pipe part 64 in the direction shown by arrows in FIGS. 10(b)–10(e). Then, one of the claw parts 67a and 67b of the canister vent valve 61 selectively engages one of the stoppers 66a and 66b of the canister 60 so that the canister vent valve 61 is retained to the canister 60 in one of the final positions, as shown in full lines in FIGS. 10(b)–10(e). The canister 60 is mounted to the vehicle in such an orientation that one of the vehicle mounting portions 24a', 24b', 24c' and 24d' is selectively fixedly located on top relative to the upward direction of the vehicle. Accordingly, the canister vent valve 61 is selectively mounted to the canister 60 in one of the four positions shown in FIGS. 10(b)–10(e) so that the mounting angle of the canister vent valve 61 with respect to the vehicle is preferably within a predetermined operating range relative to the vertical direction of the vehicle.

Since the second embodiment provides four possible mounting angles of the canister vent valve 61 with respect to the canister 60, the range of choices regarding the mounting angles of the canister 60 with respect to a vehicle is expanded even more than with the first embodiment of the present invention. Accordingly, the canister 60 can be shared by larger number of vehicles with different models.

Third Embodiment

Referring to FIGS. 11, 12(a), and 12(b)–12(g), a canister vent valve mounting structure in accordance with a third embodiment of the present invention will now be explained. In view of the similarity between the first and third embodiments, the parts of the third embodiment that are identical to the parts of the first embodiment will be given the same reference numerals as the parts of the first embodiment. Moreover, the descriptions of the parts of the third embodiment that are identical to the parts of the first embodiment may be omitted for the sake of brevity.

Basically, the canister vent valve mounting structure of the third embodiment of the present invention differs from the first embodiment in that a modified canister 70 with a first vent valve connecting section and a modified vent valve 71 with a second vent valve connecting section are used. This third embodiment includes a canister vent valve mounting structure in which a mounting position of the canister vent valve 71 with respect to the canister 70 can be selected from six prescribed angular positions, as shown in FIGS. 12(b)–12(g).

Figure 11:
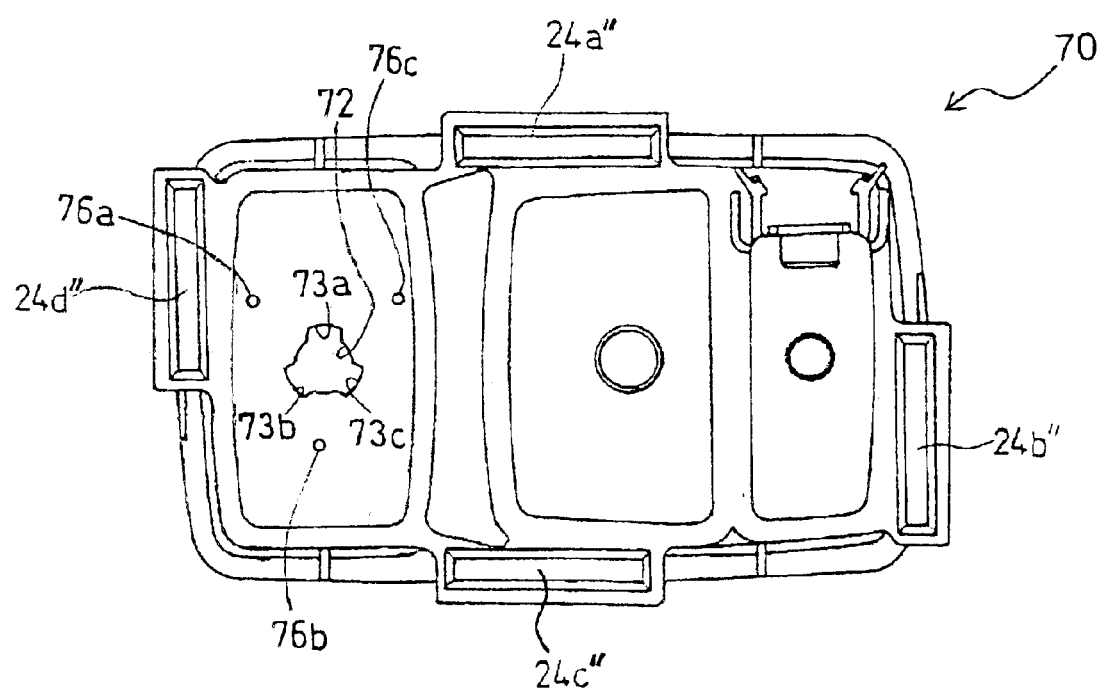
FIG. 11 is a front side elevational view of a canister in accordance with a third embodiment of the present invention.
Figure 12C:
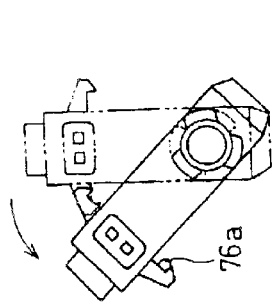
FIGS. 12(b)–(g) are partial schematic views of the canister and the vent valve illustrated in FIGS. 11 and 12(a) in accordance with the third embodiment of the present invention, showing various initial insertion positions (shown in broken lines) and final orientations (shown in full lines) of the vent valve with respect to the canister.
Figure 12E:
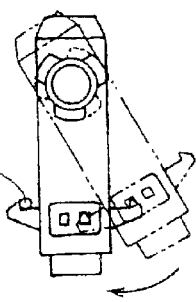
Figure 12G:
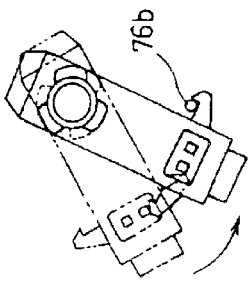
Figure 12B:
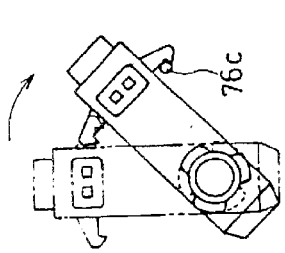
Figure 12D:
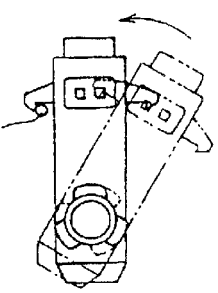
Figure 12F:
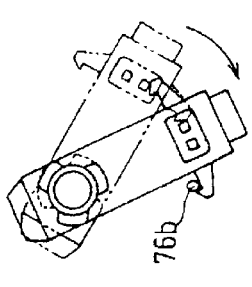
Figure 12A:
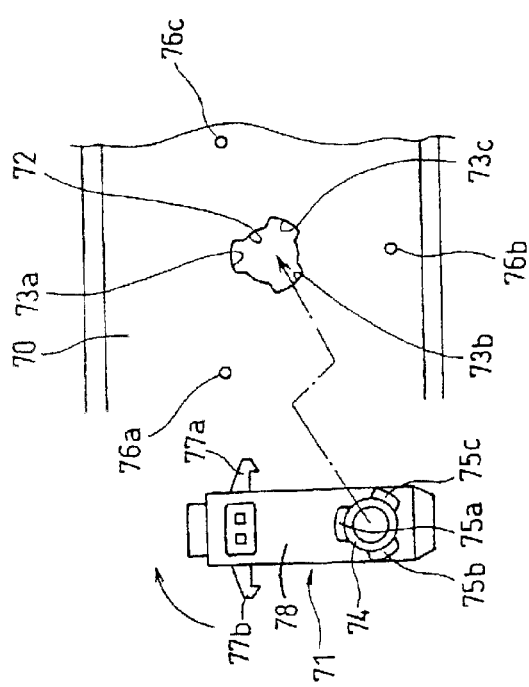
FIGS. 12(a) is a partial front side elevational view of the canister illustrated in FIG. 11 and a vent valve that include a canister vent valve mounting structure in accordance with the third embodiment of the present invention.

In this third embodiment, the canister 70 basically includes four vehicle mounting portions 24a″, 24b″, 24c′ and 24d″, an insertion hole 72 with three mating notches 73a, 73b and 73c, and three stoppers or catch parts 76a, 76b and 76c, as seen in FIG. 11. The insertion hole 72 and the mating notches 73a, 73b and 73c together basically constitute the first vent valve connecting section of the canister 70. The canister vent valve 71 basically includes a modified connecting pipe part 74 with three mating projections 75a, 75b and 75c, and a pair of claw parts 77a and 77b, as shown in FIG. 12(a). The mating projections 75a, 75b and 75c are configured to be selectively mate with the mating notches 73a, 73b and 73c of the canister 70. The connecting pipe part 74 and the mating projections 75a, 75b and 75c together basically constitute the second vent valve connecting section of the canister vent valve 71 that is configured to be rotationally coupled with the first vent valve connecting section of the canister 70.

The vehicle mounting portions 24a″, 24b″, 24c″ and 24d″ are separately disposed on each of the four peripheral edges of the canister 70, respectively. Thus, the canister 70 can be selectively mounted onto the vehicle in four different orientations relative to the vehicle.

As shown in FIG. 11, the mating notches 73a, 73b and 73c of the canister 70 are preferably formed on an inner circumferential rim of the insertion hole 72 in positions substantially 120 degrees apart to each other. The mating notches 73a, 73b and 73c are preferably configured to mate with the complementary projections formed on the second vent valve connecting section of the vent valve 71. The stoppers 76a, 76b and 76c are disposed substantially 120 degree apart about a center axis of the insertion hole 72, as seen in FIG. 11. Moreover, the stoppers 76a, 76b and 76c are preferably configured such that one of the stoppers 76a, 76b and 76c selectively engages one of complementary retaining members or claw parts 77a and 77b of the canister vent valve 71 by bending to retain the canister vent valve 71 to the canister 70. Accordingly, the stoppers 76a, 76b and 76c can be considered either first or second retaining members that selectively engage one of the claw parts 77a and 77b to retain the canister vent valve 71 in one of the various mounting positions relative to the canister 70. Moreover, the stoppers 76a, 76b and 76c can be considered part of the first vent valve connecting section that is configured to be rotationally coupled with the second vent valve connecting section of the canister vent valve 71. Furthermore, it will be apparent to those skilled in the art from this disclosure that each of the stoppers 76a, 76b and 76c can have a breaking prevention rib or element that prevents the stoppers 76a, 76b or 76c from breaking due to excessive bending deformation.

The claw parts 77a and 77b of the canister vent valve 71 are disposed substantially 180 degrees apart about a center axis of a main body part 78 of the canister vent valve 71, as shown in FIG. 12(a). The claw parts 77a and 77b are configured to selectively engage with the stoppers 76a, 76b and 76c of the canister 70 to retain the canister vent valve 71 in one of the various mounting positions relative to the canister 70. Accordingly, the claw parts 76a, 76b and 76c can be considered either first or second retaining members that selectively engage with the complementary retaining members or stoppers 76a, 76b and 76c of the canister 70. Moreover, the claw parts 76a, 76b and 76c can be considered part of the second vent valve connecting section. Furthermore, the claw parts 76a, 76b and 76c of the canister vent valve 71 and the stoppers 76a, 76b and 76c of the canister 70 together constitute a rotation regulating mechanism or structure that determines the mounting angle of the canister vent valve 71 with respect to the canister 70 when the canister vent valve 71 and the canister 70 are coupled together.

FIGS. 12(b)–12(g) show schematic views of different initial insertion positions and final fixed positions of the canister vent valve 71 with respect to the canister 70 in accordance with the third embodiment of the present invention. The portions drawn with broken lines in FIGS. 12(b)–12(g) show the positions of the canister vent valve 71 when the connecting pipe part 64 of the canister vent valve 71 is inserted into the insertion hole 72 of the canister 70. After the canister vent valve 71 is inserted into the insertion hole 72, the canister vent valve 71 is rotated relative to the insertion hole 72 about the center axis of the connecting pipe part 74 in the direction shown by arrows in FIGS. 12(b)–12(g). Then one of the claw parts 77a and 77b of the canister vent valve 71 selectively engages with one of the stoppers 76a, 76b and 76c of the canister 70 so that the canister vent valve 71 is retained to the canister 70 in one of the final positions, as shown in full lines in FIGS. 12(b)–12(g). The canister 70 is mounted to the vehicle in such an orientation that one of the vehicle mounting portions 24a″, 24b″, 24c″ and 24d″ is selectively fixedly located on top relative to the upward direction of the vehicle. Accordingly, the canister vent valve 71 is selectively mounted to the canister 70 in one of the six positions shown in FIGS. 12(b)–12(g) so that the mounting angle of the canister vent valve 71 with respect to the vehicle is preferably within a predetermined operating range relative to the vertical direction of the vehicle.

Since the third embodiment provides six possible mounting angles of the canister vent valve 71 with respect to the canister 70, the range of choices regarding the mounting angle of the canister 70 with respect to a vehicle is expanded even more than with the second embodiment. Accordingly, the canister 70 can be shared by even larger number of vehicles with different models. Moreover, in this third embodiment, the three mating projections 75a, 75b and 75c and the three mating notches 73a, 73b and 73c are provided for mounting the canister vent valve 71 to the canister 70. Therefore, the center axial positions of the connecting pipe part 74 and the insertion hole 72 are aligned more accurately than having two projections and two notches when the connecting pipe part 74 is inserted into the insertion hole 72. Accordingly, the accurate alignment of the center axial positions of the connecting pipe part 74 and the insertion hole 72 prevents pinching of an O-ring or seal member that seals a space between the connection pipe part 74 and the insertion hole 72 when the canister 70 and the canister vent valve 71 are coupled together.

Fourth Embodiment

Figure 13:
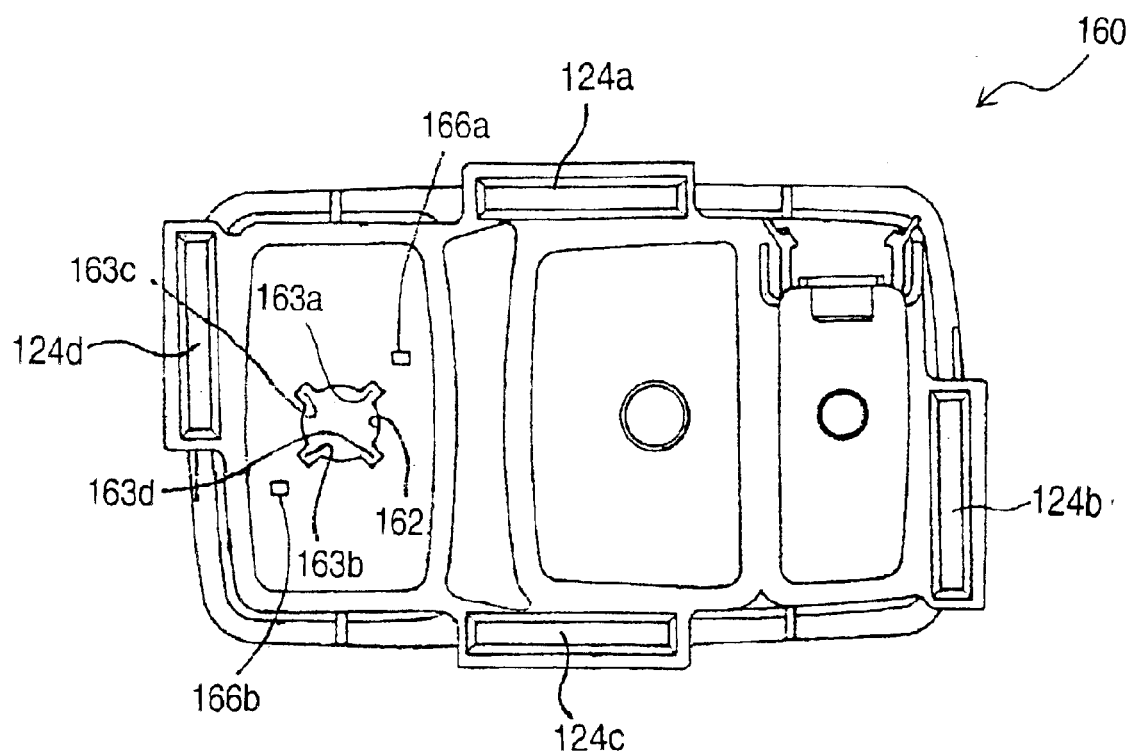
FIG. 13 is a front side elevational view of a canister in accordance with a fourth embodiment of the present invention.
Figure 14:
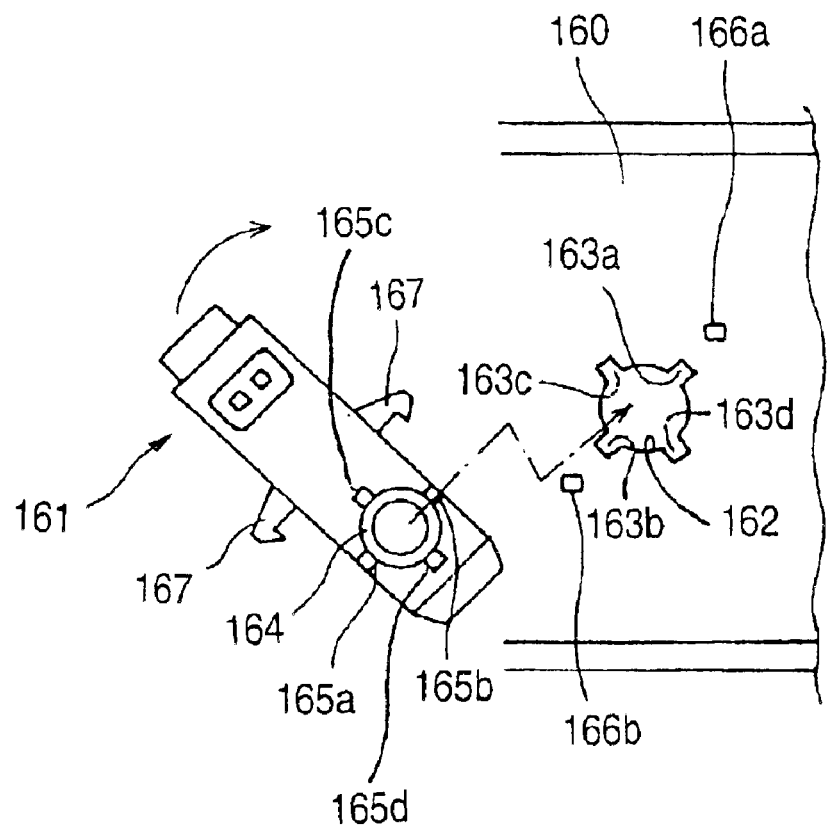
FIG. 14 is a partial front side elevational view of the canister illustrated in FIG. 13 and a vent valve that include a canister vent valve mounting structure in accordance with the fourth embodiment of the present invention.

Referring to FIGS. 13 and 14, a canister vent valve mounting structure in accordance with a fourth embodiment will now be explained. In view of the similarity between the second and fourth embodiments, the fourth embodiment will not be discussed in detail herein. Thus, the descriptions of the parts of the fourth embodiment that are identical to the parts of the second embodiment may be omitted for the sake of brevity.

This fourth embodiment includes a canister 160 and a vent valve 161 that are identical in construction and function as the canister 60 and the canister vent valve 61 of the second embodiment, respectively, except that four mating notches 163a, 163b, 163c and 163d, and four mating projections 165a, 165b, 165c and 165d are formed on the canister 160 and the vent valve 161, respectively, instead of only two mating notches and two mating projections. This fourth embodiment, similar to the second embodiment, provides a canister vent valve mounting structure in which a mounting position of the canister vent valve 161 with respect to the canister 160 can be selected from the same four angular positions, as shown in FIGS. 10(b)–10(e) of the second embodiment. Moreover, in this fourth embodiment, the four mating projections 165a, 165b, 165c and 165d, and the four notches 163a, 163b, 163c and 163d are provided for mounting the canister vent valve 161 to the canister 160. Therefore, the center positions of the connecting pipe part 164 and the insertion hole 162 are aligned more accurately than having two projections and two notches when the connecting pipe part 164 is inserted into the insertion hole 162. Accordingly, the accurate alignment of the center axial positions of the connecting pipe part 164 and the insertion hole 162 prevents pinching of an O-ring or seal member that seals a space between the connection pipe part 164 and the insertion hole 162 when the canister 160 and the canister vent valve 161 are coupled together.

As used herein, the following directional terms "forward, rearward, above, downward, vertical, horizontal, below and transverse" as well as any other similar directional terms refer to those directions of a vehicle equipped with the present invention. Accordingly, these terms, as utilized to describe the present invention should be interpreted relative to a vehicle equipped with the present invention.

Moreover, terms that are expressed as "means-plus function" in the claims should include any structure that can be utilized to carry out the function of that part of the present invention.

The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

This application claims priority to Japanese Patent Application No. 2002-062782. The entire disclosure of Japanese Patent Application No. 2002-062782 is hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A canister vent valve mounting structure comprising:

a first vent valve connecting section adapted to be coupled to a canister configured to adsorb fuel vapors produced inside a fuel tank, the first vent valve connecting section including an insertion hole;

a second vent valve connecting section adapted to be coupled to a canister vent valve configured to introduce outside air into the canister, the second vent valve connecting section including a connecting pipe part that fits into the insertion hole; and a sealing member being configured to seal a space between the connecting pipe part and the insertion hole when the first and second vent valve connecting sections are coupled together, one of the first and second vent valve connecting sections including a plurality of mating projections that are circumferentially spaced apart near the tip thereof, the other of the first and second vent valve connecting sections including a protrusion with a plurality of mating notches into which the mating projections are inserted, the mating projections and the mating notches being configured to mate with each other such that the protrusion engages the projections upon relative rotational movement of the first and second vent valve connecting sections, the first and second vent valve connecting sections including a rotation regulating structure configured to selectively retain the first and second vent valve connecting sections in at least two different angular positions relative to each other.

2. The canister vent valve mounting structure as recited in claim 1, wherein the rotation regulating structure includes at least one first retaining member disposed on the first vent valve connecting section, and at least one second retaining member disposed on the second vent valve connecting section to selectively engage the first retaining member.

3. The canister vent valve mounting structure as recited in claim 2, wherein the first retaining member includes a catch part, and the second retaining member includes a claw part configured to selectively engage the catch part of the first retaining member.

4. The canister vent valve mounting structure as recited in claim 3, wherein the first retaining member is configured and arranged to selectively engage the second retaining member by bending.

5. The canister vent valve mounting structure as recited in claim 4, wherein the first retaining member has a breaking prevention element to limit bending of the first retaining member.

6. The canister vent valve mounting structure as recited in claim 1, wherein the mating projections include four projections that are generally equally spaced apart about a center axis of the relative rotational movement of the first and second vent valve connecting sections, and the mating notches include four complementary notches.

7. The canister vent valve mounting structure as recited in claim 6, wherein the mating projections are disposed on the second vent valve connecting section and the mating notches are disposed on the first vent valve connecting section.

8. The canister vent valve mounting structure as recited in claim 7, wherein the rotation regulating structure includes at least one first retaining member disposed on the first vent valve connecting section, and at least one second retaining member disposed on the second vent valve connecting section to selectively engage the first retaining member.

9. The canister vent valve mounting structure as recited in claim 8, wherein the rotation regulating structure includes two of the first retaining members and one of the second retaining member.

10. The canister vent valve mounting structure as recited in claim 9, wherein each of the first retaining members includes a catch part, and the second retaining member includes a claw part configured to selectively engage one of the catch parts of the first retaining members such that the first and second vent valve connecting sections are retained in one of a plurality of different angular positions depending which of the catch parts is engaged.

11. The canister vent valve mounting structure as recited in claim 10, wherein the first retaining members are configured and arranged to selectively engage the second retaining member by bending.

12. The canister vent valve mounting structure as recited in claim 11, wherein each of the first retaining members has a breaking prevention element to limit bending thereof.

13. The canister vent valve mounting structure as recited in claim 1, wherein the mating projections include two projections located substantially 180 degrees apart about a center axis of the relative rotational movement of the first and second vent valve connecting sections, and the mating notches include two complementary notches.

14. The canister vent valve mounting structure as recited in claim 13, wherein the rotation regulating structure includes at least one first retaining member disposed on the first vent valve connecting section, and at least one second retaining member disposed on the second vent valve connecting section to selectively engage the first retaining member.

15. The canister vent valve mounting structure as recited in claim 14, wherein the rotation regulating structure includes two of the first retaining members located substantially 180 degrees apart about the center axis of the relative rotational movement of the first and second vent valve connecting sections, and two of the second retaining members.

16. The canister vent valve mounting structure as recited in claim 15, wherein each of the first retaining members includes a catch part, and each of the second retaining members includes a claw part configured to selectively engage one of the catch parts of the first retaining members such that the first and second vent valve connecting sections are retained in one of a plurality of different angular positions depending which of the claw parts and the catch parts are engaged.

17. The canister vent valve mounting structure as recited in claim 1, wherein the mating projections include three projections that are generally equally spaced apart about a center axis of the relative rotational movement of the first and second vent valve connecting sections, and the mating notches include three complementary notches.

18. The canister vent valve mounting structure as recited in claim 17, wherein the rotation regulating structure includes at least one first retaining member disposed on the first vent valve connecting section, and at least one second retaining member disposed on the second vent valve connecting section to selectively engage the first retaining member.

19. The canister vent valve mounting structure as recited in claim 18, wherein the rotation regulating structure includes three of the first retaining members and two of the second retaining members.

20. The canister vent valve mounting structure as recited in claim 19, wherein each of the first retaining members includes a catch part, and each of the second retaining members includes a claw part configured to selectively engage one of the catch parts of the first retaining members.

21. A canister assembly comprising:

a canister configured to adsorb fuel vapors produced inside a fuel tank including a first vent valve connecting section and at least one vehicle mounting portion;

a canister vent valve configured to introduce outside air into the canister including a second vent valve connecting section that engages with the vent valve receiving section of the canister; and a sealing member being configured to seal a space between the first and second vent valve connecting sections when the first and second vent valve connecting sections are coupled together, one of the first and second vent valve connecting sections including a plurality of mating projections that are circumferentially spaced apart near the tip thereof, the other of the first and second vent valve connecting sections including a protrusion with a plurality of mating notches into which the mating projections are inserted, the mating projections and the mating notches being configured to mate with each other such that the protrusion engages the projection upon relative rotational movement of the first and second vent valve connecting sections, the canister and the canister vent valve including a rotation regulating structure configured to selectively retain the canister and the canister vent valve in at least two different angular positions relative to each other.

22. The canister assembly as recited in claim 21, wherein the rotation regulating structure includes at least one first retaining member disposed on the first vent valve connecting section, and at least one second retaining member disposed on the second vent valve connecting section to selectively engage the first retaining member.

23. The canister assembly as recited in claim 22, wherein the canister includes two separately located vehicle mounting portions that provides different orientations of the canister relative to a vehicle when the canister is fixedly coupled to the vehicle by using one of the vehicle mounting portions.

24. A canister vent valve mounting structure comprising:

first and second vent valve connecting means for connecting a canister configured to adsorb fuel vapors produced inside a fuel tank with a canister vent valve configured to introduce outside air into the canister, the first and second connecting means being having complementary mating structures that are coupled together by a relative rotational movement;

sealing means for sealing a space between the first and second vent valve connecting means when the first and the vent valve connecting means are coupled together; and rotation regulating means for selectively retaining the first and second vent valve connecting means in at least two different angular positions relative to each other.

* * * * *